(No Model.) 2 Sheets—Sheet 1.

C. D. WEEKS.
WROUGHT METAL PULLEY.

No. 466,204. Patented Dec. 29, 1891.

Witnesses.
E. Byron Gilchrist

Inventor.
Charles D. Weeks
Attorneys (No Model.) 2 Sheets—Sheet 2.

C. D. WEEKS.
WROUGHT METAL PULLEY.

No. 466,204. Patented Dec. 29, 1891.

Witnesses.
E. Byam Gilchrist

Inventor.
Charles D. Weeks.
Liggett & Liggett
Attorneys

UNITED STATES PATENT OFFICE.

CHARLES D. WEEKS, OF AKRON, OHIO.

WROUGHT-METAL PULLEY.

SPECIFICATION forming part of Letters Patent No. 466,204, dated December 29, 1891.

Application filed July 8, 1891. Serial No. 398,849. (No model.)

*To all whom it may concern:*

Be it known that I, CHARLES D. WEEKS, of Akron, in the county of Summit and State of Ohio, have invented certain new and useful Improvements in Wrought-Metal Pulleys; and I do hereby declare the following to be a full, clear, and exact description of the invention, such as will enable others skilled in the art to which it pertains to make and use the same.

My invention relates to improvements in wrought-metal pulleys of the variety known as "split pulleys;" and it consists in certain features of construction and in combination of parts, hereinafter described, and pointed out in the claims.

Figure 1:
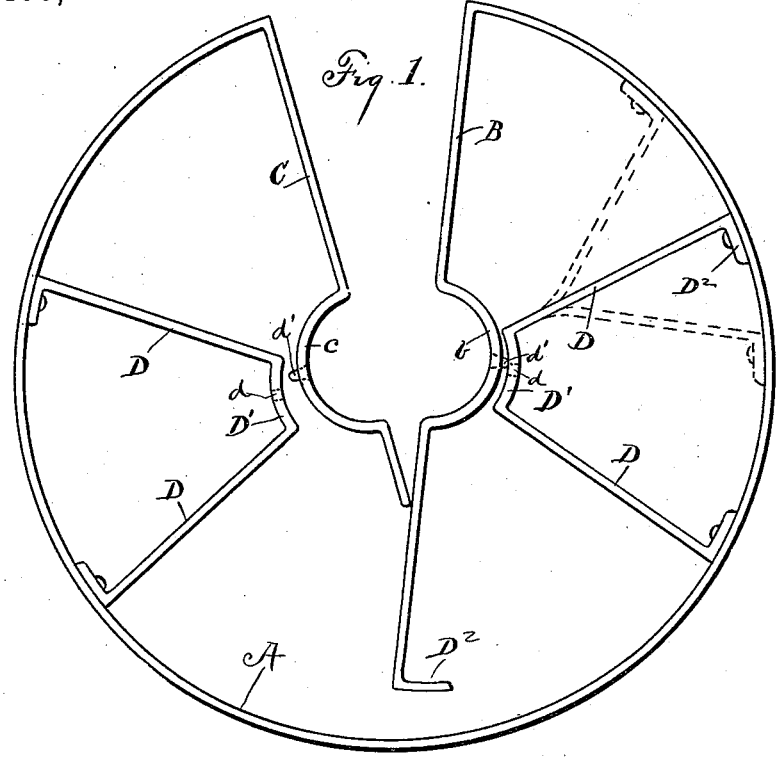
Figure 2:
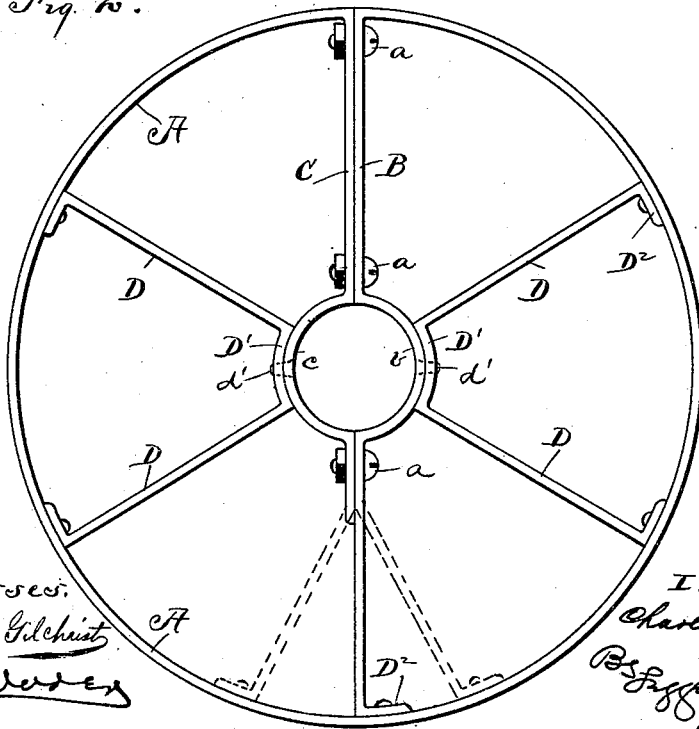
Figure 3:
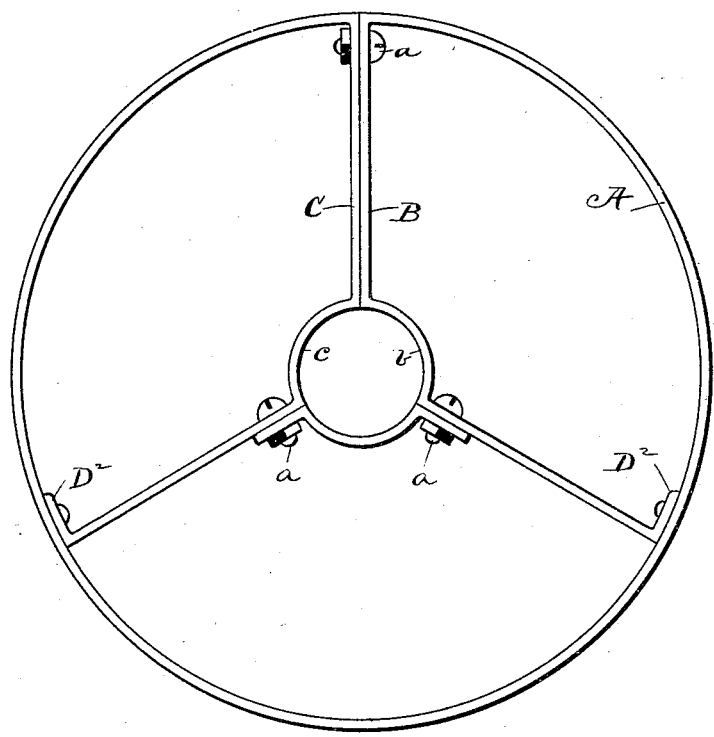

In the accompanying drawings, Figures 1 and 2 are end elevations, respectively showing the pulley closed and open; and Fig. 3 is a view of a modified form of pulley.

A represents the rim of the pulley, constructed of a sheet or plate of wrought metal of suitable width for the face of the pulley, the plate being thicker or thinner according to the size of the pulley and to the labor that the pulley is to perform. The rim of the pulley is integral with arms or spokes B and C. These arms are curved outward at $b$ and $c$ to form the hub of the pulley, this hub being adapted to fit a shaft of given standard size. These arms are provided with securing-bolts $a\ a\ a$, and in tightening these bolts to close the pulley the hub is clamped onto the shaft, so that no other fastening is required. A similar plate of metal is bent to form pairs of auxiliary arms D D, with a curved section at D', adapted to fit the exterior of the hub, and with toes or flanges $D^2$ for riveting or otherwise securing to the rim. Section D' has preferably a hole $d$ for receiving a steady-pin $d'$, the latter being rigid with the hub.

In very small pulleys arms D D might be omitted, and in large pulleys these arms might be duplicated, or these arms might be split at their outer ends and bent so as to engage the rim at different points. (See dotted lines, Fig. 1.)

When bolts $a$ are loosened and removed, the recoil of the rim will likely open the pulley, as shown in Fig. 1, in which open position the pulley can readily be placed upon or removed from the shaft.

These pulleys are strong and light and are manufactured by means of suitable dies, whereby they can be produced at a small initial cost and whereby the pulleys run as true as a cast-iron turned pulley, and the wrought-iron pulleys are not liable to be broken by jarring or blows received by the pulley falling or otherwise, whereas cast-metal pulleys are frequently strained in casting, by reason of which heavy jars or a light blow will sometimes crack such pulleys.

From the fact that my improved pulley when opened for placing it upon the shaft is still intact or connected by the rim the parts cannot be inadvertently misplaced, as is frequently done with the ordinary split pulleys, where the two halves of the pulley are entirely separated.

What I claim is—

1. A wrought-metal pulley open at a point in its rim, the ends at the opening bent inwardly to form the hub and one or more spokes of the pulley, substantially as set forth.

2. A metal pulley consisting of an open rim and arms integral with the rim at the split point, said arms extending parallel with each other and secured together face to face and curved at the center of the wheel to form a hub, substantially as set forth.

3. A wrought-metal split pulley having arms integral with the rim, such arms having curved sections constituting the pulley-hub, and auxiliary arms shaped approximately as shown, and having sections adapted to fit the hub externally and having toes or flanges for fastening to the rim and having, preferably, a hole for engaging a steady-pin connected with the hub, substantially as set forth.

In testimony whereof I sign this specification, in the presence of two witnesses, this 7th day of May, 1891.

CHARLES D. WEEKS.

Witnesses:
   JAMES D. PARDEE,
   JAS. W. SCOTT.